(12) United States Patent
Gunderi et al.

(10) Patent No.: US 12,709,401 B2
(45) Date of Patent: Aug. 18, 2026

(54) LATCH ASSEMBLY FOR AN AIRCRAFT PROPULSION SYSTEM

(71) Applicant: Rohr, Inc., Chula Vista, CA (US)

(72) Inventors: Mallikarjuna Gunderi, Chitradurga (IN); Biju Laly, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 19/079,017

(22) Filed: Mar. 13, 2025

(65) Prior Publication Data

US 2025/0289577 A1 Sep. 18, 2025

(30) Foreign Application Priority Data

Mar. 13, 2024 (IN) ............................ 202411018267

(51) Int. Cl.
*B64D 29/06* (2006.01)
*B64D 29/08* (2006.01)
*E05C 3/08* (2006.01)

(52) U.S. Cl.
CPC ............. *B64D 29/06* (2013.01); *B64D 29/08* (2013.01); *E05C 3/08* (2013.01)

(58) Field of Classification Search
CPC ........... B64D 29/06; B64D 29/08; E05C 3/08; E05B 63/06
See application file for complete search history.

(56) References Cited

U.S. PATENT DOCUMENTS

| | | | | |
|---|---|---|---|---|
| 2,904,141 A * | 9/1959 | Henrichs | B64D 29/06 | 292/108 |
| 4,602,812 A * | 7/1986 | Bourne | E05C 19/145 | 292/DIG. 60 |
| 7,748,778 B1 * | 7/2010 | Udriste | B60N 2/43 | 297/378.11 |
| 7,770,942 B2 | 8/2010 | Homner | | |

(Continued)

*Primary Examiner* — Kristina R Fulton
*Assistant Examiner* — Thomas L Neubauer
(74) *Attorney, Agent, or Firm* — Getz Balich LLC

(57) ABSTRACT

A latch assembly includes a first latch assembly portion. The first latch assembly portion includes a hook. The hook includes a hook body and a retention assembly. The hook body forms a hook engagement surface. The hook engagement surface extends about a pin axis. The hook body forms a groove at the hook engagement surface. The groove extends about the pin axis. The hook body forms a slot at the outer body side. The retention assembly includes a stopper, a rack, and a pinion gear. The stopper is disposed within the groove. The stopper extends about the pin axis between and to a first end and a second end. The stopper includes an outer radial surface and an inner radial surface. The stopper includes a stopper gear surface at the outer radial surface. The inner radial surface is disposed at the hook engagement surface. The stopper is pivotable in the groove about the pin axis. The rack is disposed within the slot. The rack extends between and to an outer rack side and an inner rack side. The rack includes a linear rack gear surface at the inner rack side. The rack is translatable within the slot. The pinion gear is disposed within the hook body. The pinion gear is rotatable about a rotational axis. The pinion gear includes a pinion (Continued)

gear surface. The pinion gear surface is engaged with the stopper gear surface and the linear rack gear surface.

20 Claims, 5 Drawing Sheets

(56) References Cited

U.S. PATENT DOCUMENTS

| | | | | |
|---|---|---|---|---|
| 10,137,996 | B2 * | 11/2018 | Mellor | B64D 29/06 |
| 11,536,064 | B2 | 12/2022 | Micallef | |
| 11,597,529 | B2 * | 3/2023 | Parsell, Jr. | E05C 19/145 |
| 2013/0328326 | A1 * | 12/2013 | DeFrance | E05C 19/10 292/114 |
| 2016/0347465 | A1 * | 12/2016 | Mellor | B64D 29/06 |
| 2017/0058568 | A1 * | 3/2017 | Do | E05C 19/145 |
| 2017/0101811 | A1 * | 4/2017 | Parsell, Jr. | E05C 19/145 |
| 2023/0250682 | A1 * | 8/2023 | Newell | E05B 63/06 292/259 A |

* cited by examiner

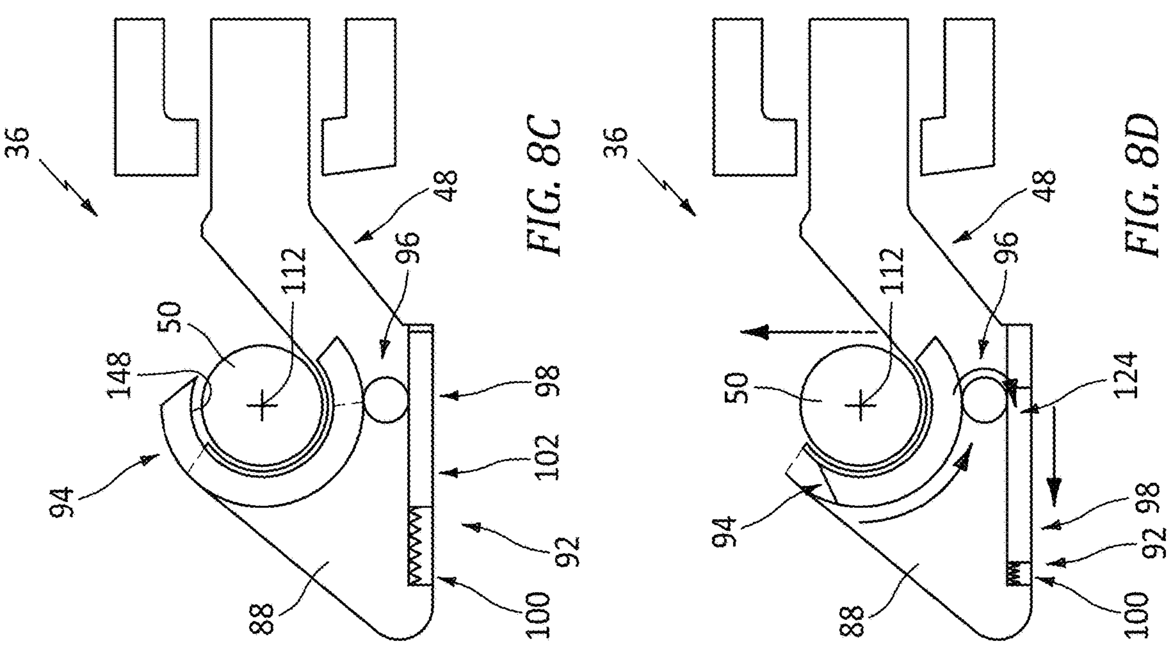
FIG. 8C
FIG. 8D
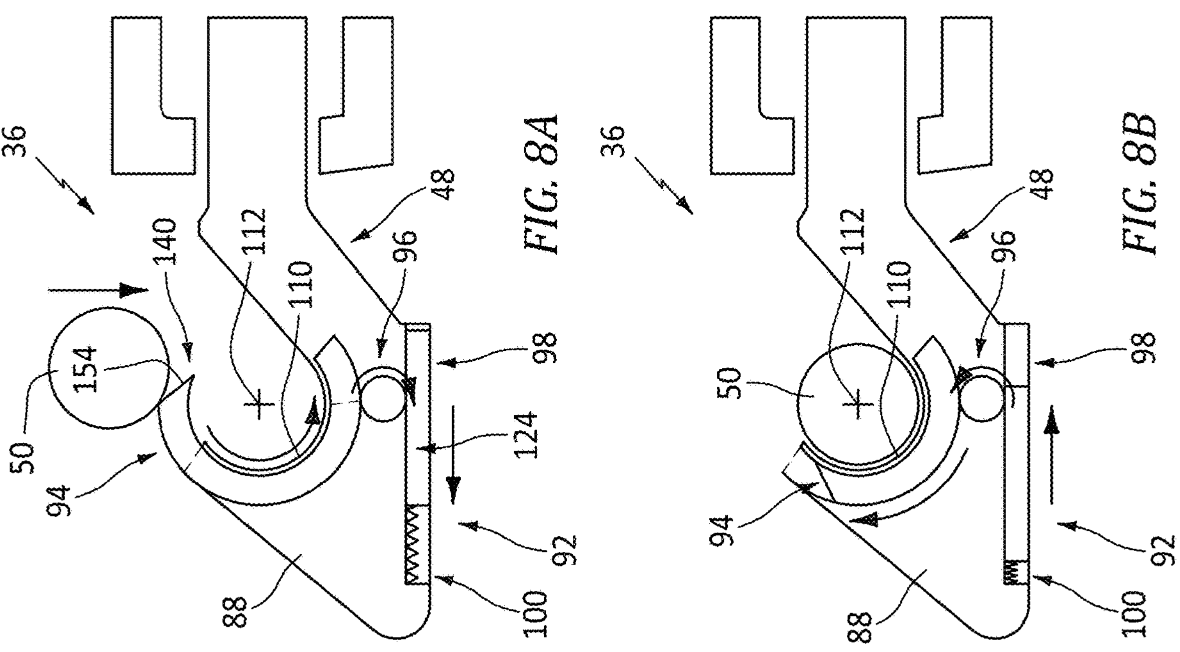
FIG. 8A
FIG. 8B

LATCH ASSEMBLY FOR AN AIRCRAFT PROPULSION SYSTEM

This application claims priority to Indian Patent Appln. No. 202411018267 filed Mar. 13, 2024 which is hereby incorporated herein by reference in its entirety.

BACKGROUND

1. Technical Field

This disclosure relates generally to aircraft propulsion systems, and more particularly to latch assemblies for aircraft propulsion systems.

2. Background Information

Propulsion systems, such as those used for aircraft, may include a nacelle configured to house, for example, a gas turbine engine and other auxiliary systems. The nacelle may include one or more cowl panel sections (e.g., a fan cowl, a thrust reverser cowl, etc.). The cowl panel sections may include one or more movable cowl panels configured to provide access to internal components of the propulsion system (e.g., the gas turbine engine). The moveable cowl panels may be secured during flight by one or more latch assemblies. Various types and configurations of latch assemblies are known in the art. While these known latch assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a latch assembly for an aircraft propulsion system includes a first latch assembly portion. The first latch assembly portion includes a hook. The hook includes a hook body and a retention assembly. The hook body extends between and to an outer body side and an inner body side. The hook body forms a hook engagement surface of the hook at the inner body side. The hook engagement surface extends about a pin axis. The hook body forms a groove at the hook engagement surface. The groove extends about the pin axis. The hook body forms a slot at the outer body side. The retention assembly includes a semi-annular stopper, a rack, and a pinion gear. The semi-annular stopper is disposed within the groove. The semi-annular stopper extends about the pin axis between and to a first end and a second end. The semi-annular stopper includes an outer radial surface and an inner radial surface. The semi-annular stopper includes a stopper gear surface at the outer radial surface. The inner radial surface is disposed at the hook engagement surface. The semi-annular stopper is pivotable in the groove about the pin axis between and to an extended pivot position and a retracted pivot position. The rack is disposed within the slot. The rack extends between and to an outer rack side and an inner rack side. The rack includes a linear rack gear surface at the inner rack side. The rack is translatable within the slot between a first translation position and a second translation position. The pinion gear is disposed within the hook body. The pinion gear is rotatable about a rotational axis. The pinion gear includes a pinion gear surface. The pinion gear surface is engaged with the stopper gear surface and the linear rack gear surface.

In any of the aspects or embodiments described above and herein, the latch assembly may further include a second latch assembly portion. The second latch assembly portion may include a latch pin. The latch pin may be positionable within the hook at the pin axis.

In any of the aspects or embodiments described above and herein, the stopper in the extended pivot position may extend outside of the hook body relative to the pin axis. The stopper in the extended pivot position may radially obstruct the latch pin with the latch pin positioned at the pin axis.

In any of the aspects or embodiments described above and herein, the retention assembly may further include a biasing member disposed within the slot. The biasing member may be disposed between the hook body and the rack to bias the rack in the second translation position.

In any of the aspects or embodiments described above and herein, translation of the rack from the second translation position to the first translation position may pivot the stopper from the extended pivot position to the retracted pivot position. Translation of the rack from the first translation position to the second translation position may pivot the stopper from the retracted pivot position to the extended pivot position.

In any of the aspects or embodiments described above and herein, the hook body and the hook engagement surface may extend between and to a first hook lateral end and a second hook lateral end. The hook body may have a first lateral width extending from the first hook lateral end to the second hook lateral end. The stopper may extend between and to a first stopper lateral end and a second stopper lateral end. The stopper may have a second lateral width extending from the first stopper lateral end to the second stopper lateral end. The second lateral width may be between 20 percent and 50 percent of the first lateral width.

In any of the aspects or embodiments described above and herein, the second lateral width may be between 30 percent and 35 percent of the first lateral width.

In any of the aspects or embodiments described above and herein, the groove may be disposed at a laterally intermediate portion of the hook engagement surface.

In any of the aspects or embodiments described above and herein, the stopper may include a beveled surface at the first end. The beveled surface may extend between and to the outer radial surface and the first end at the inner radial surface.

In any of the aspects or embodiments described above and herein, the hook body may form opposing rails at the slot. The rack may be engaged with the opposing rails. The rack may be translatable along the opposing rails between and to the first translation position and the second translation position.

According to another aspect of the present disclosure, a latch assembly for an aircraft propulsion system includes a first latch assembly portion. The first latch assembly portion includes a latch body, a latch handle, and a hook. The latch body extends between and to a first latch end and a second latch end. The latch body forms a hook aperture at the first latch end. The latch handle is pivotably mounted to the latch body at the second latch end. The hook includes a shaft, a hook body, and a retention assembly. The shaft is mounted to the latch body within the hook aperture. The hook body extends between and to an outer body side and an inner body side. The outer body side is disposed facing the latch handle. The hook body forms a groove at the inner body side. The groove extends about a pin axis. The hook body forms a slot at the outer body side. The retention assembly includes a semi-annular stopper, a rack, and a pinion gear. The semi-annular stopper is disposed within the groove. The semi-annular stopper extends about the pin axis between and to a first end and a second end. The semi-annular stopper includes an outer radial surface and an inner radial surface. The semi-annular stopper includes a stopper gear surface at the outer radial surface. The semi-annular stopper is pivotable in the groove about the pin axis between and to an extended pivot position and a retracted pivot position. The rack is disposed within the slot. The rack extends between and to an outer rack side and an inner rack side. The outer rack side is disposed at the outer body side. The rack includes a linear rack gear surface at the inner rack side. The rack is translatable within the slot between a first translation position and a second translation position. The pinion gear is disposed within the hook body. The pinion gear is rotatable about a rotational axis. The pinion gear includes a pinion gear surface. The pinion gear surface is engaged with the stopper gear surface and the linear rack gear surface.

In any of the aspects or embodiments described above and herein, the latch assembly may further include a second latch assembly portion. The second latch assembly portion may include a latch pin. The latch pin may be positionable within the hook at the pin axis.

In any of the aspects or embodiments described above and herein, the latch assembly may further include a first hinged cowl panel and a second hinged cowl panel adjacent the first hinged cowl panel. The first latch assembly portion may be mounted to the first hinged cowl panel. The second latch assembly portion may be mounted to the second hinged cowl panel.

In any of the aspects or embodiments described above and herein, the stopper in the extended pivot position may extend outside of the hook body relative to the pin axis. The stopper in the extended pivot position may radially obstruct the latch pin with the latch pin positioned at the pin axis.

In any of the aspects or embodiments described above and herein, with the stopper in the retracted pivot position, the first end may be disposed within the hook body.

In any of the aspects or embodiments described above and herein, the retention assembly may further include a biasing member disposed within the slot. The biasing member may be disposed between the hook body and the rack to bias the rack in the second translation position.

In any of the aspects or embodiments described above and herein, translation of the rack from the second translation position to the first translation position may pivot the stopper from the extended pivot position to the retracted pivot position. Translation of the rack from the first translation position to the second translation position may pivot the stopper from the retracted pivot position to the extended pivot position.

According to another aspect of the present disclosure, a latch assembly for an aircraft propulsion system includes a first latch assembly portion. The first latch assembly portion includes a hook. The hook includes a hook body and a retention assembly. The hook body forms a hook engagement surface of the hook. The hook engagement surface extends about a pin axis. The hook body forms a groove at the hook engagement surface. The groove extends about the pin axis. The hook body forms a slot. The retention assembly includes a semi-annular stopper, a rack, a pinion gear, and a biasing member. The semi-annular stopper is disposed within the groove. The semi-annular stopper extends about the pin axis between and to a first end and a second end. The semi-annular stopper includes an outer radial surface and an inner radial surface. The semi-annular stopper includes a stopper gear surface at the outer radial surface. The semi-annular stopper is pivotable in the groove about the pin axis between and to an extended pivot position and a retracted pivot position. The rack is disposed within the slot. The rack extends between and to an outer rack side and an inner rack side. The rack includes a linear rack gear surface at the inner rack side. The rack is translatable within the slot between a first translation position and a second translation position. The pinion gear is disposed within the hook body. The pinion gear is rotatable about a rotational axis. The pinion gear includes a pinion gear surface. The pinion gear surface is engaged with the stopper gear surface and the linear rack gear surface. The biasing member is disposed within the slot. The biasing member is disposed between the hook body and the rack to bias the rack in the second translation position.

In any of the aspects or embodiments described above and herein, translation of the rack from the second translation position to the first translation position may pivot the stopper from the extended pivot position to the retracted pivot position. Translation of the rack from the first translation position to the second translation position may pivot the stopper from the retracted pivot position to the extended pivot position.

In any of the aspects or embodiments described above and herein, the hook body may extend between and to a first hook lateral end and a second hook lateral end. The hook body may have a first lateral width extending from the first hook lateral end to the second hook lateral end. The stopper may be disposed in the groove at a laterally intermediate portion of the hook body. The stopper may extend between and to a first stopper lateral end and a second stopper lateral end. The stopper may have a second lateral width extending from the first stopper lateral end to the second stopper lateral end. The second lateral width may be between 20 percent and 50 percent of the first lateral width.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 8A-D schematically illustrate cutaway views of the hook of FIG. 4 at a plurality of operating states, in accordance with one or more embodiments of the present disclosure.

DETAILED DESCRIPTION

Figures 1, 2:
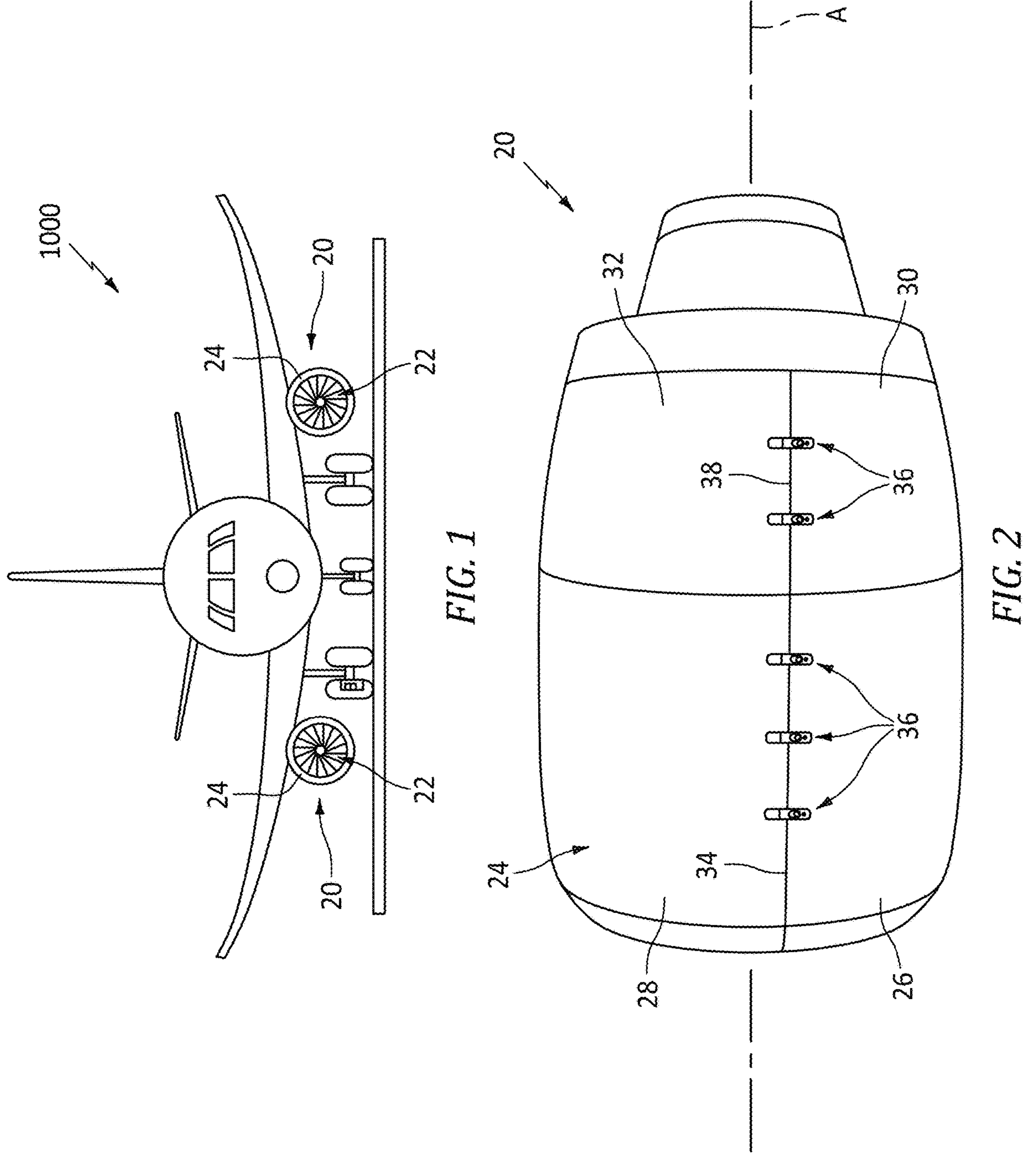
FIG. 1 schematically illustrates an aircraft including a propulsion system, in accordance with one or more embodiments of the present disclosure.
FIG. 2 schematically illustrates a side view of a propulsion system for an aircraft, in accordance with one or more embodiments of the present disclosure.

FIGS. 1 and 2 schematically illustrate an aircraft 1000 including at least one propulsion system 20. The propulsion system 20 may include, for example a gas turbine engine 22 housed within a nacelle 24. The gas turbine engine 22 of FIG. 1 is configured as a turbofan gas turbine engine. However, aspects of the present disclosure may be equally applicable to other configurations of gas turbine engines (e.g., a turboshaft gas turbine engine, a turboprop gas turbine engine, a turbojet gas turbine engine, a propfan gas turbine engine, an open rotor gas turbine engine, etc.). Moreover, aspects of the present disclosure may also be equally applicable to aircraft propulsion systems including intermittent combustion engines (e.g., rotary engines), battery-electric propulsion assemblies, hybrid-electric propulsion assemblies, and the like.

The nacelle 24 may extend circumferentially about (e.g., completely around) an axis A (e.g., a centerline axis of the propulsion system 20) to house and circumscribe the gas turbine engine 22. The nacelle 24 includes a plurality of aerodynamic panels forming an exterior of the nacelle 24. For example, the nacelle 24 may include a first fan cowl panel 26 and a second fan cowl panel 28. The nacelle 24 may additionally include a first thrust reverser panel 30 and a second thrust reverser panel 32. Each of the panels 26, 28, 30, 32 may be removable, hinged, or otherwise positionable to facilitate access to internal components of the propulsion system 20 (e.g., the gas turbine engine 22).

The first fan cowl panel 26 and the second fan cowl panel 28 are selectively coupled together along a seam 34 by at least one latch assembly 36. The latch assembly 36 is configurable in a latched condition or an unlatched condition. In the latched condition, the latch assembly 36 retains the first fan cowl panel 26 and the second fan cowl panel 28 together along the seam 34. In the latched condition, the latch assembly 36 may sit flush or substantially flush relative to the first fan cowl panel 26 and the second fan cowl panel 28, or the latch assembly 36 may be recessed within the first fan cowl panel 26 and/or the second fan cowl panel 28. In the unlatched condition, the latch assembly 36 may permit relative movement between the first fan cowl panel 26 and the second fan cowl panel 28 to facilitate access to internal components of the propulsion system 20. In the unlatched condition, the latch assembly 36 may protrude outside and/or away from the first fan cowl panel 26 and the second fan cowl panel 28. The first thrust reverser panel 30 and the second thrust reverser panel 32 may be selectively coupled together along a seam 38 by the at least one latch assembly 36 as described above for the first fan cowl panel 26 and the second fan cowl panel 28. The present disclosure is not limited to use of the latch assembly 36 with the foregoing exemplary aerodynamic panels (e.g., the panels 26, 28, 30, 32), and the present disclosure latch assembly 36 may be used with other aerodynamic panels, cowls, doors, etc. of the aircraft 1000 or its propulsion system 20.

Figure 3:
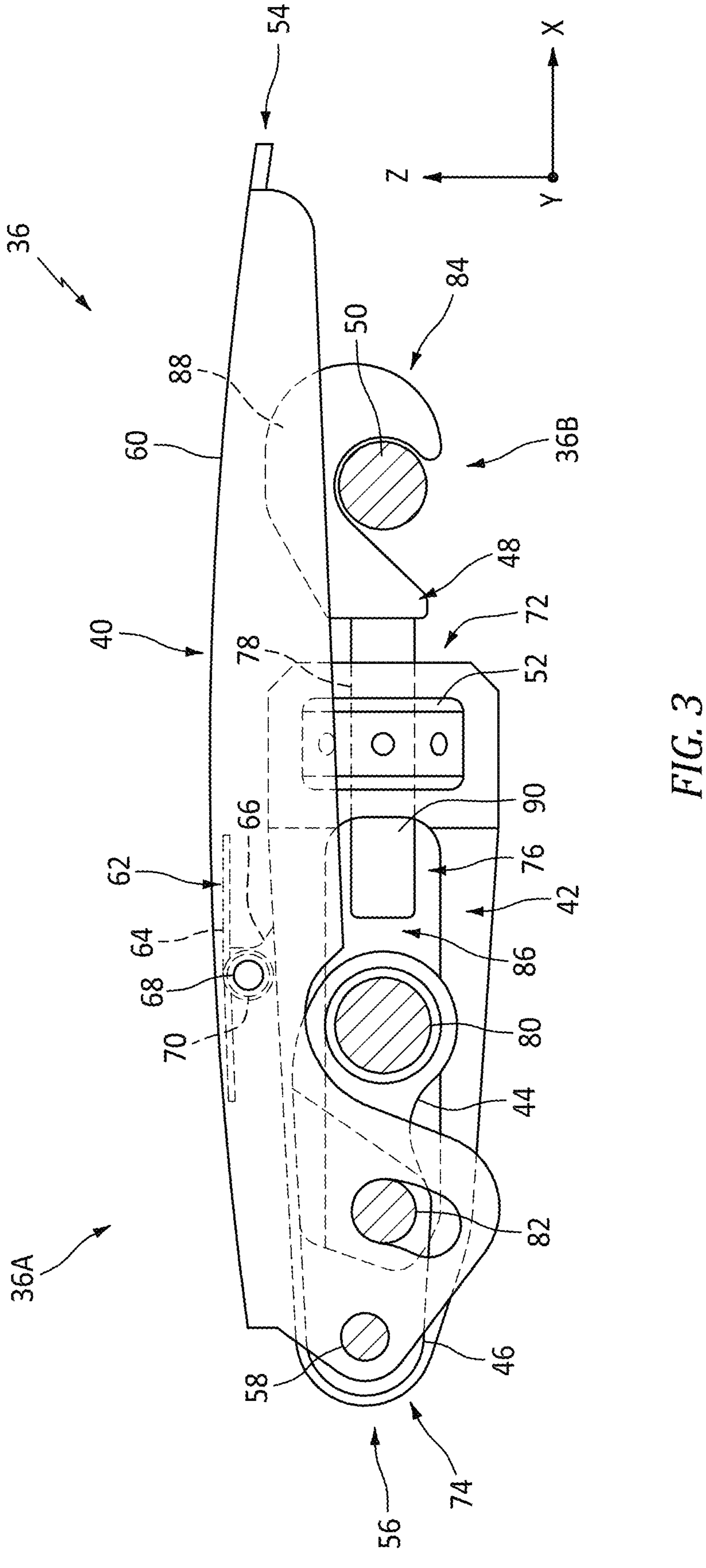
FIG. 3 illustrates a cutaway, side view of a latch assembly for the propulsion system of FIG. 2, in accordance with one or more embodiments of the present disclosure.

FIG. 3 illustrates a cutaway, side view of the latch assembly 36. The latch assembly 36 of FIG. 3 is illustrated in the latched condition. The latch assembly 36 of FIG. 3 will be described herein relative to and for use with the first fan cowl panel 26 and the second fan cowl panel 28 (see FIG. 2). However, as previously discussed, the present disclosure latch assembly 36 is not limited to use with the first fan cowl panel 26 and the second fan cowl panel 28. The latch assembly 36 of FIG. 3 includes a latch handle 40, a latch body 42, one or more first linkages 44, one or more second linkages 46, a hook 48, and a latch pin 50. The latch assembly 36 may additionally include an adjustment nut 52. The latch assembly 36 is arranged as a first latch assembly portion 36A and a second latch assembly portion 36B (e.g., a keeper portion). The first latch assembly portion 36A is mounted at (e.g., on, adjacent, or proximate) the first fan cowl panel 26. The first latch assembly portion 36A includes the latch handle 40, the latch body 42, the first linkages 44, the second linkages 46, and the hook 48. The second latch assembly portion 36B is mounted at (e.g., on, adjacent, or proximate) the second fan cowl panel 28. The second latch assembly portion 36B includes the latch pin 50.

The latch handle 40 extends axially, in the X-direction, between and to a first axial end 54 of the latch handle 40 and a second axial end 56 of the latch handle 40. The latch handle 40 is pivotably connected to the latch body 42 and the second linkage 46 by a first pin 58 of the latch assembly 36 at (e.g., on, adjacent, or proximate) the second axial end 56. The latch handle 40 is pivotable about the first pin 58 to configure the latch assembly 36 in the latch condition or the unlatched condition. The latch handle 40 includes an exterior side 60 extending between and to the first axial end 54 and the second axial end 56. The exterior side 60 forms an exterior of the latch assembly 36 at (e.g., on, adjacent, or proximate) the first fan cowl panel 26 and the second fan cowl panel 28 (see FIG. 2). For example, the exterior side 60 may sit flush or substantially flush relative to the first tan cowl panel 26 and the second fan cowl panel 28, or the exterior side 60 may be recessed within the first fan cowl panel 26 and/or the second fan cowl panel 28.

The latch assembly 36 may include a locking device 62 on the latch handle 40 configured to fix the latch handle 40 (e.g., relative to the latch body 42) to selectively retain the latch assembly 36 in the latched condition. For example, the locking device 62 of FIG. 3 a push button 64 and a locking hook 66. The push button 64 is disposed at (e.g., on, adjacent, or proximate) the exterior side 60 (e.g., within an aperture of the latch handle 40) such that it can be accessed by an operator from outside the propulsion system 20 (see FIGS. 1 and 2). The locking hook 66 is mounted to the push button 64. The locking device 62 (e.g., the push button 64 and the locking hook 66) of FIG. 3 is pivotably mounted to the latch handle 40 by a pin 68. The locking device 62 is pivotable about the pin 68 between an engaged condition of the locking hook 66 with the latch body 42 and a disengaged condition of the locking hook 66 with the latch body 42. The locking device 62 may further include a biasing member 70 (e.g., a spring) configured to pivotably bias the locking device 62 in the engaged condition. In operation, of the locking device 62, the push button 64 may be depressed (e.g., by an operator) to pivot the locking device 62 from the engaged condition to the disengaged condition, thereby allowing the latch handle 40 to be operated to configure the latch assembly 36 in the unlatched condition.

The latch body 42 extends axially between and to a first axial end 72 of the latch body 42 and a second axial end 74 of the latch body 42. The latch body 42 is pivotably connected to the latch handle 40 and the second linkage 46 by the pin 58 of the latch assembly 36 at (e.g., on, adjacent, or proximate) the second axial end 74. The latch body 42 forms a slot 76 extending laterally, in the Y-direction, through the latch body 42. The slot 76 extends axially lengthwise. The latch body 42 further forms a hook aperture 78 at (e.g., on, adjacent, or proximate) the first axial end 72. The hook aperture 78 extends axially through the latch body 42 from the first axial end 72.

The first linkages 44 are pivotably connected to a second pin 80 and a third pin 82. The second pin 80 is disposed within the slot 76. The second pin 80 is configured to axially translate within the slot relative to the latch body 42. The second pin 80 of FIG. 3 is mounted to the first fan cowl panel 26 (see FIG. 2). The first linkages 44 are pivolably connected to the latch handle 40 and respective ones of the second linkages 46 by the third pin 82. The first linkages 44 may include two linkages disposed at (e.g., on, adjacent, or proximate) opposite lateral sides of the latch body 42 (e.g., laterally between the latch handle 40 and the latch body 42). Alternatively, the first linkages 44 may include a single linkage disposed laterally within the latch body 42.

The second linkages 46 are pivotably connected to the latch handle 40 and the latch body 42 by the first pin 58. The second linkages 46 are pivotably connected to the latch handle 40 and respective ones of the first linkages 44 by the third pin 82. Similar to the first linkages 44, the second linkages 46 may include two linkages disposed at (e.g., on, adjacent, or proximate) opposite lateral sides of the latch body 42 (e.g., laterally between the latch handle 40 and the latch body 42). Alternatively, the second linkages 46 may include a single linkage disposed laterally within the latch body 42.

The hook 48 extends axially between and to a first axial end 84 of the hook 48 and a second axial end 86 of the hook 48. The hook 48 includes a hook body 88 and a shaft 90. The hook body 88 is disposed at (e.g., on, adjacent, or proximate) the first axial end 84. The hook body 88 forms a concave hook shape configured to engage the latch pin 50. As shown in FIG. 3, the hook 48 may be installed on the latch body 42 such that the concave hook shape formed by the hook body 88 is disposed vertically, in the Z-direction, opposite the hook body 88 from the latch handle 40 (e.g., with the latch assembly 36 in the latched condition). The shaft 90 extends axially between and to the hook body 88 and the second axial end 86. The shaft 90 is disposed and selectively positionable within the hook aperture 78. For example, the shaft 90 may include a threaded exterior configured to engage the latch body 42 (e.g., a threaded portion of the latch body 42) at (e.g., on, adjacent, or proximate) the hook aperture 78.

The latch pin 50 of FIG. 3 is fixedly mounted to the second fan cowl panel 28 (see FIG. 2). The latch pin 50 extends laterally. The latch pin 50 is configured and positioned to engage the hook 48 (e.g., the hook body 88) during operation of the latch assembly 36 (e.g., with the latch assembly 36 in the latched condition).

The latch assembly 36 may include the adjustment nut 52 to facilitate selective control of the axial position of the hook 48 (e.g., the hook body 88) on the latch body 42 and relative to the latch pin 50. The adjustment nut 52 may be disposed, for example, within the latch body 42. The adjustment nut 52 may form a portion (e.g., an intermediate axial portion) of the hook aperture 78. The adjustment nut 52 may include a threaded interior at (e.g., on, adjacent, or proximate) the hook aperture 78 configured to engage the threaded exterior of the shaft 90. The adjustment nut 52 may be axially constrained by the latch body 42. The adjustment nut 52 may be rotatable within the latch body 42 about a rotational axis (and the shaft 90) extending in the axial direction. The adjustment nut 52 may be accessible from an exterior of the latch body 42 to facilitate operation by an operator to rotate the adjustment nut 52 to adjust and control the axial position of the hook 48 (e.g., the hook body 88).

Figure 4:
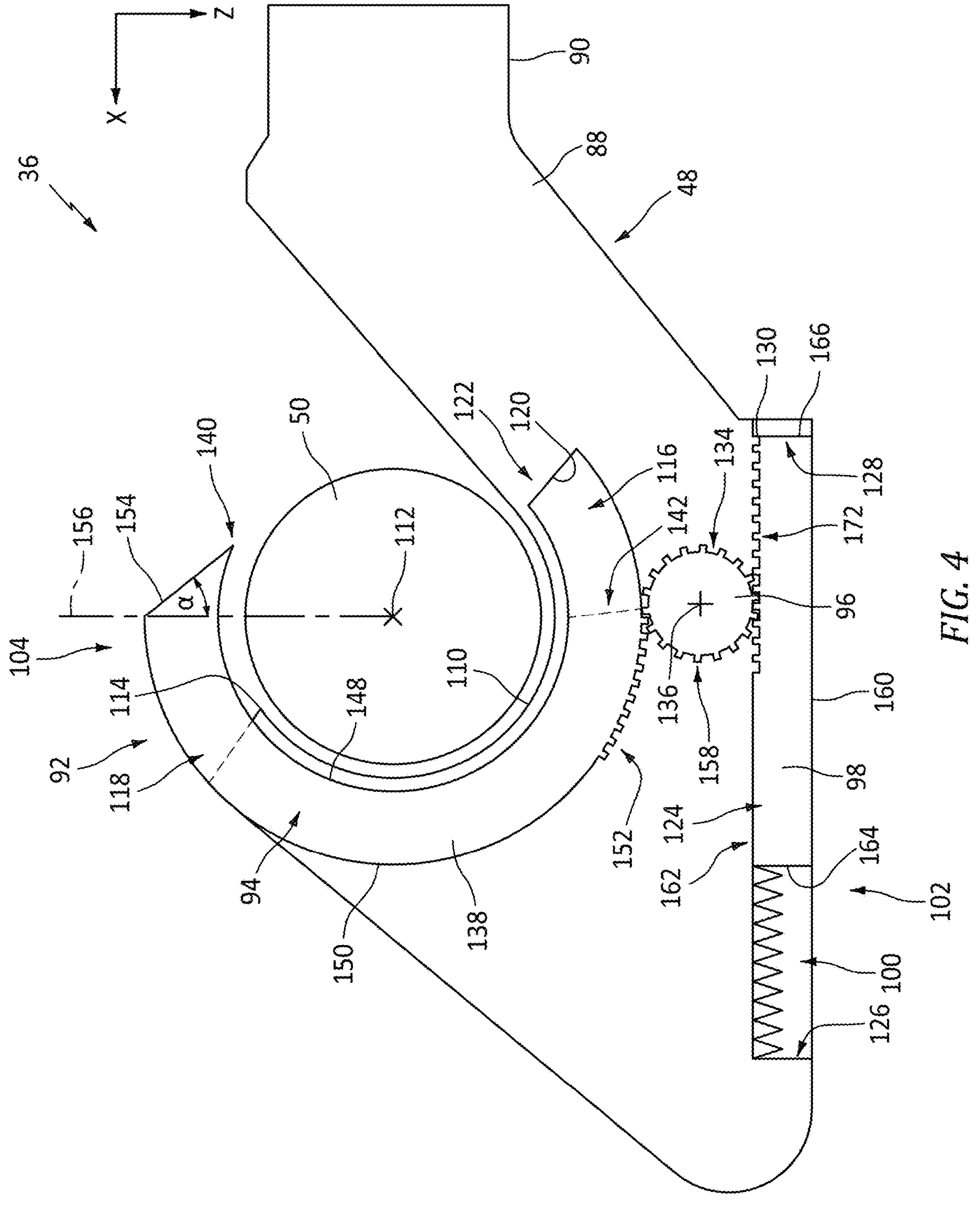
FIG. 4 schematically illustrates a cutaway view of a portion of a hook for the latch assembly of FIG. 3, in accordance with one or more embodiments of the present disclosure.
Figures 5, 6, 7:
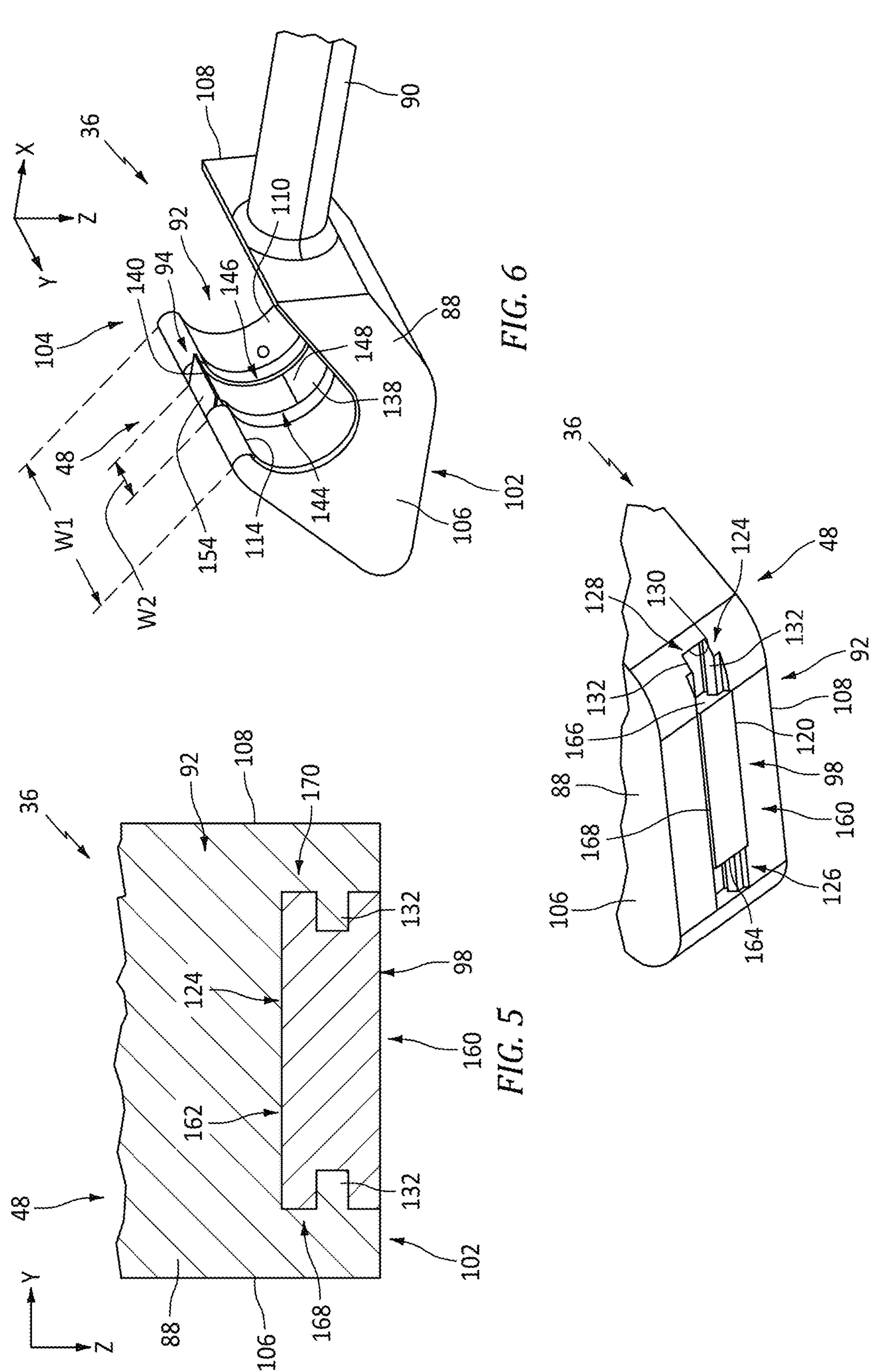
FIG. 5 schematically illustrates a cutaway view of another portion of the hook of FIG. 4, in accordance with one or more embodiments of the present disclosure.
FIG. 6 illustrates a perspective view of the hook of FIG. 4, in accordance with one or more embodiments of the present disclosure.
FIG. 7 illustrates another perspective view of the hook of FIG. 4, in accordance with one or more embodiments of the present disclosure.

FIGS. 4-7 illustrate the hook 48 in greater detail. FIG. 4 illustrates a cutaway view of a portion of the hook 48 along an X-Z plane. FIG. 5 illustrates a cutaway view of a portion of the hook 48 along a Y-Z plane. FIGS. 6 and 7 illustrate perspective views of the hook 48. The hook 48 of FIGS. 4-7 further includes a retention assembly 92 configured to facilitate secure retention of the latch pin 50 engaged with the hook 48 (e.g., with the latch assembly 36 in the latched condition). The retention assembly 92 of FIGS. 4-7 includes the hook body 88, a stopper 94, a pinion gear 96, a rack 98, and a biasing member 100. The present disclosure is not limited to use of the hook 48 with the foregoing exemplary latch assembly 36.

The hook body 88 extends (e.g., in the Z-direction) between and to an outer body side 102 of the hook body 88 and an inner body side 104 of the hook body 88. The outer body side 102 is disposed adjacent and/or facing the latch handle 40 with the latch assembly 36 in the latched condition (see FIG. 3). The hook body 88 extends laterally, in the Y-direction, between and to a first lateral end 106 of the hook body 88 and a second lateral end 108 of the hook body 88. As previously discussed, the hook body 88 forms a concave hook shape configured to engage the latch pin 50. The hook body 88 forms a hook engagement surface 110 of the hook 48 at (e.g., on, adjacent, or proximate) the inner body side 104. The hook engagement surface 110 may extend (e.g., circumferentially extend) about (e.g., partially around) an axis 112 (e.g., a laterally extending axis). The axis 112 may substantially correspond to a center position of the latch pin 50 with the hook body 88 (e.g., the hook engagement surface 110) engaged with the latch pin 50. The hook engagement surface 110 may be shaped, for example, as a circumferential segment or subcircular segment extending circumferentially about the axis 112. For example, the hook engagement surface 110 may extend between approximately 180 degrees and 270 degrees about the axis 112. The hook engagement surface 110 of FIG. 4 extends circumferentially in a direction from a vertically-intermediate (e.g., in the Z-direction) position to a distal end 114 of the hook engagement surface 110 formed by the hook body 88 at the inner body side 104. The hook engagement surface 110 extends laterally between and to the first lateral end 106 and the second lateral end 108.

The hook body 88 forms a groove 116 at (e.g., on, adjacent, or proximate) the hook engagement surface 110. For example, the groove 116 may be disposed at a laterally-intermediate portion of the hook engagement surface 110. The groove 116 extends (e.g., circumferentially extends) about (e.g., partially around) the axis 112 along the hook engagement surface 110 between and to a first circumferential end 118 of the groove 116 and a second circumferential end 120 of the groove 116. The first circumferential end 118 is an open (e.g., unobstructed) circumferential end disposed at (e.g., on, adjacent, or proximate) the distal end 114. The second circumferential end 120 is formed by the hook body 88. For example, the second circumferential end 120 may be formed by a rotation stop surface 122 of the hook body 88.

The hook body 88 forms a slot 124 at (e.g., on, adjacent, or proximate) the outer body side 102. For example, the slot 124 may be disposed at a laterally-intermediate portion of the outer body side 102. The slot 124 extends (e.g., linearly or substantially linearly) axially along the outer body side 102 between and to a first axial end 126 of the slot 124 and a second axial end 128 of the slot 124. The hook body 88 forms the first axial end 126. The hook body 88 may form a translation stop surface 130 at (e.g., on, adjacent, or proximate) and forming the second axial end 128. The hook body 88 may form opposing (e.g., laterally opposing) rails 132 at (e.g., on, adjacent, or proximate) and within the slot 124. The rails 132 may axially extend all or a portion of the axial distance between the first axial end 126 and the second axial end 128.

The hook body 88 forms a pinion gear cavity 134 extending between and to the groove 116 and the slot 124. The pinion gear cavity 134 may be a cylindrical cavity, for example, extending circumferentially about (e.g., completely around) a rotation axis 136 (e.g., a laterally extending axis).

The stopper 94 includes a semi-annular stopper body 138. The stopper body 138 extends circumferentially about (e.g., partially circumferentially around) the axis 112 between and to a first circumferential end 140 of the stopper body 138 and a second circumferential end 142 of the stopper body 138. The stopper body 138 extends laterally between and to a first lateral end 144 of the stopper body 138 and a second lateral end 146 of the stopper body 138. The stopper body 138 includes an inner radial surface 148 and an outer radial surface 150 (e.g., relative to the axis 112). The inner radial surface 148 and the outer radial surface 150 extend circumferentially between and to the first circumferential end 140 and the second circumferential end 142. The inner radial surface 148 and the outer radial surface 150 extend laterally between and to the first lateral end 144 and the second lateral end 146. The outer radial surface 150 includes a circular gear surface 152 extending circumferentially along at least a circumferential portion of the outer radial surface 150. The stopper 94 (e.g., the stopper body 138) is disposed within the groove 116 with the inner radial surface 148 disposed at (e.g., on, adjacent, or proximate) the hook engagement surface 110. For example, the inner radial surface 148 may form a portion of the hook engagement surface 110. The inner radial surface 148 may be radially recessed from the hook engagement surface 110 (e.g., relative to the axis 112). The hook body 88 may laterally encompass a portion of the stopper body 138 (e.g., the inner radial surface 148) to retain the stopper body 138 radially within the hook body 88. However, the present disclosure is not limited to any particular retention configuration between the hook body 88 and the stopper body 138. The stopper 94 is pivotably about the axis 112, within the groove 116, relative to the hook body 88. The stopper 94 (e.g., the stopper body 138) is pivotable about the axis 112 between and to an extended pivot position and a retracted pivot position. In the extended pivot position, the first circumferential end 140 is disposed circumferentially outside of the hook body 88, relative to the axis 112. In the retracted pivot position, the first circumferential end 140 is disposed circumferentially at (e.g., on, adjacent, or proximate) the inner body side 104 (e.g., the distal end 114) or within the hook body 88.

The stopper body 138 may form a beveled surface 154 at (e.g., on, adjacent, or proximate) the first circumferential end 140. For example, the beveled surface 154 of FIG. 4 extends between and to the outer radial surface 150 and the first circumferential end 140 at (e.g., on, adjacent, or proximate) the inner radial surface 148. Accordingly, the inner radial surface 148 may have a greater circumferential span than the outer radial surface 150. The beveled surface 154 may be oriented at a bevel angle α relative to a radial plane 156 intersecting the axis 112. The bevel angle α may be determined, for example, between the beveled surface 154 and the radial plane 156 with the radial plane 156 extending through the intersection of the outer radial surface 150 and the beveled surface 154. The bevel angle α may be, for example, between 30 degrees and 60 degrees, however, the present disclosure is not limited to any particular value for the bevel angel α.

The hook body 88 has a lateral width W1 extending laterally between and to the first lateral end 106 and the second lateral end 108. Similarly, the stopper body 138 has a lateral width W2 extending laterally between and to the first lateral end 144 and the second lateral end 146. As shown in FIG. 6, the lateral width W1 is greater than the lateral width W2. The lateral width W2 may be between 20 percent and 50 percent of the lateral width W1 or, more preferably, between 30 percent and 35 percent of the lateral width W1. As the lateral width W2 increases relative to the lateral width W1 (e.g., greater than about 35 percent), the structural strength of the hook body 88 for securely engaging the latch pin 50 (see FIG. 3) and fixing the first fan cowl panel 26 relative to the second fan cowl panel 28 (see FIG. 2) may be substantially reduced. Similarly, as the lateral width W2 decreases relative to the lateral width W1 (e.g., less than about 30 percent), the structural strength of the stopper body 138 for securely retaining the latch pin 50 within the hook 48 may be substantially reduced. Of course, suitable relative sizing of the hook body 88 and the stopper body 138 may vary depending on the particular application of a latch assembly including the hook 48.

The pinion gear 96 is disposed within the pinion gear cavity 134. The pinion gear 96 is rotatable within the pinion gear cavity 134 about the rotational axis 136. For example, the pinion gear 96 may be mounted to a pin or other shaft body extending along the rotational axis 136. The pinion gear 96 includes a circular gear surface 158 extending circumterentially about the pinion gear 96. The circular gear surface 158 is engaged (e.g., meshed) with the circular gear surface 152.

The rack 98 extends (e.g., vertically in the Z-direction) between and to an outer side 160 of the rack 98 and an inner side 162 of the rack 98. The rack 98 extends (e.g., axially in the X-direction) between and to a first axial end 164 of the rack 98 and a second axial end 166 of the rack 98. The rack 98 extends (e.g., laterally extends in the Y-direction) between and to a first lateral end 168 of the rack 98 and a second lateral end 170 of the rack 98. The rack 98 may include embossed features or other raised surface texture along the outer side 160 to facilitate suitable grip by an operator. The rack 98 includes a linear gear surface 172 at (e.g., on, adjacent, or proximate) the inner side 162. The rack 98 is disposed within the slot 124. The linear gear surface 172 is engaged (e.g., meshed) with the circular gear surface 158. The rack 98 may be engaged with the rails 132 at (e.g., on, adjacent, or proximate) the first lateral end 168 and the second lateral end 170 to retain the rack 98 within the slot 124. The rack 98 is configured to translate (e.g., axially) within the slot 124 along (e.g., guided by) the rails 132. The rack 98 is axially translatable within the slot 124 between and to a first axial translation position at (e.g., on, adjacent, or proximate) the first axial end 126 and a second axial translation position at (e.g., on, adjacent, or proximate) the second axial end 128 (e.g., at the translation stop surface 130). The first axial end 164 is disposed at (e.g., on, adjacent, or proximate) and/or engaged with the biasing member 100. The outer side 160 may sit flush or substantially flush with the hook body 88 along the outer body side 102. Alternatively, the outer side 160 may be disposed outside of or recessed within the hook body 88 along the outer body side 102.

The biasing member 100 is disposed within the slot 124 at (e.g., on, adjacent, or proximate) the first axial end 126. For example, the biasing member 100 may be securely mounted or otherwise positioned within the slot 124 inward of the rails 132 (e.g., in a direction from the outer body side 102 to the inner body side 104. The biasing member 100 is disposed between the first axial end 126 and the first axial end 164. The biasing member 100 may contact one or both of the hook body 88 at (e.g., on, adjacent, or proximate) the first axial end 126 and the first axial end 164. The biasing member 100 is configured to bias the rack 98 away from the first axial end 126 and toward the second axial end 128, for example, in the second axial translation position. The biasing member 100 may be configured, for example, as one or more springs, however, the present disclosure is not limited to any particular configuration of the biasing member 100.

Referring to FIGS. 3 and BA-D, in operation to configure the latch assembly 36 in the latched condition, the hook 48 is moved relative to the latch pin 50 to position the latch pin 50 within the hook 48 (e.g., engaged with the hook engagement surface 110 and/or positioned at the axis 112) (see FIGS. 8A and 8B). As the hook 48 is moved relative to the latch pin 50, the latch pin 50 may contact the stopper 94 at (e.g., on, adjacent, or proximate) the first circumferential end 140 (e.g., the beveled surface 154). This contact between the latch pin 50 and the stopper 94 may cause the stopper 94 to pivot (e.g., about the axis 112) from the extended pivot position to or toward the retracted pivot position, driving rotation of the pinion gear 96, and thereby translation of the rack 98 to or toward the first axial translation position against the biasing force of the biasing member 100 (see FIGS. 8A and 8B). With the latch pin 50 positioned within the hook 48 (e.g., along the axis 112), the biasing member 100 biases (e.g., pushes) the rack 98 to or toward the second axial translation position, driving rotation of the pinion gear 96 to pivot and return the stopper 94 to the extended pivot position. In the extended pivot position, the stopper 94 (e.g., the inner radial surface 148) radially obstructs the latch pin 50 within the hook 48, thereby preventing unintended separation of the latch pin 50 from the hook 48 (see FIGS. 8B and 8C). Once the latch pin 50 is positioned within the hook 48 (e.g., along the axis 112), the latch handle 40 is pivoted (e.g., toward the hook 48; the position shown in FIG. 3) about the first pin 58 to pull the hook 48 against the latch pin 50 and securely fix the first fan cowl panel 26 and the second fan cowl panel 28 together with the latch assembly 36 in the latched condition. With the latch assembly 36 in the latched condition, the latch handle 40 covers (e.g., obstructs access to) the rack 98 at (e.g., on, adjacent, or proximate) the outer body side 102, thereby preventing inadvertent operation of the rack 98 which might otherwise cause the stopper 94 to pivot toward the retracted pivot position and allow the latch pin 50 to separate from the hook 48.

In operation to configure the latch assembly 36 in the unlatched position, the latch handle 40 may be pivoted (e.g., away from the hook 48), for example, in part by depressing the push button 64 to disengage the locking hook 66 from the latch body 42. With the latch handle 40 pivoted away from the hook 48, the rack 98 is accessible to an operator of the latch assembly 36. As shown in FIG. 8D, the rack 98 may be pushed to axially translate within the slot 124 from the second axial translation position to or toward the first axial translation position against the biasing force of the biasing member 100, driving rotation of the pinion gear 96 and pivoting the stopper 94 from the extended pivot position to or toward the retracted pivot position. With the stopper 94 at (e.g., on, adjacent, or proximate) the retracted pivot position, the hook 48 may be disengaged from the latch pin 50 (see FIG. 8D).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A latch assembly for an aircraft propulsion system, the latch assembly comprising:

a first latch assembly portion including a hook, the hook includes a hook body and a retention assembly, the hook body extends between and to an outer body side and an inner body side, the hook body forms a hook engagement surface of the hook at the inner body side, the hook engagement surface extends about a pin axis, the hook body forms a groove at the hook engagement surface, the groove extends about the pin axis, and the hook body forms a slot at the outer body side, and the retention assembly includes a semi-annular stopper, a rack, and a pinion gear, the semi-annular stopper is disposed within the groove, the semi-annular stopper extends about the pin axis between and to a first end and a second end, the semi-annular stopper includes an outer radial surface and an inner radial surface, the semi-annular stopper includes a stopper gear surface at the outer radial surface, the inner radial surface is disposed at the hook engagement surface, and the semi-annular stopper is pivotable in the groove about the pin axis between and to an extended pivot position and a retracted pivot position, the rack is disposed within the slot, the rack extends between and to an outer rack side and an inner rack side, the rack includes a linear rack gear surface at the inner rack side, and the rack is translatable within the slot between a first translation position and a second translation position, and the pinion gear is disposed within the hook body, the pinion gear is rotatable about a rotational axis, the pinion gear includes a pinion gear surface, and the pinion gear surface is engaged with the stopper gear surface and the linear rack gear surface.

2. The latch assembly of claim 1, further comprising a second latch assembly portion, the second latch assembly portion includes a latch pin, and the latch pin is positionable within the hook at the pin axis.

3. The latch assembly of claim 2, wherein the stopper in the extended pivot position extends outside of the hook body relative to the pin axis, and the stopper in the extended pivot position radially obstructs the latch pin with the latch pin positioned at the pin axis.

4. The latch assembly of claim 1, wherein the retention assembly further includes a biasing member disposed within the slot, and the biasing member is disposed between the hook body and the rack to bias the rack in the second translation position.

5. The latch assembly of claim 1, wherein:

translation of the rack from the second translation position to the first translation position pivots the stopper from the extended pivot position to the retracted pivot position, and translation of the rack from the first translation position to the second translation position pivots the stopper from the retracted pivot position to the extended pivot position.

6. The latch assembly of claim 1, wherein:

the hook body and the hook engagement surface extend between and to a first hook lateral end and a second hook lateral end, and the hook body has a first lateral width extending from the first hook lateral end to the second hook lateral end;

the stopper extends between and to a first stopper lateral end and a second stopper lateral end, and the stopper has a second lateral width extending from the first stopper lateral end to the second stopper lateral end;

and the second lateral width is between 20 percent and 50 percent of the first lateral width.

7. The latch assembly of claim 6, wherein the second lateral width is between 30 percent and 35 percent of the first lateral width.

8. The latch assembly of claim 6, wherein the groove is disposed at a laterally intermediate portion of the hook engagement surface.

9. The latch assembly of claim 1, wherein the stopper includes a beveled surface at the first end, and the beveled surface extends between and to the outer radial surface and the first end at the inner radial surface.

10. The latch assembly of claim 1, wherein the hook body forms opposing rails at the slot, the rack is engaged with the opposing rails, and the rack is translatable along the opposing rails between and to the first translation position and the second translation position.

11. A latch assembly for an aircraft propulsion system, the latch assembly comprising:

a first latch assembly portion including a latch body, a latch handle, and a hook, the latch body extends between and to a first latch end and a second latch end, the latch body forms a hook aperture at the first latch end, the latch handle is pivotably mounted to the latch body at the second latch end, the hook includes a shaft, a hook body, and a retention assembly, the shaft is mounted to the latch body within the hook aperture, the hook body extends between and to an outer body side and an inner body side, the outer body side is disposed facing the latch handle, the hook body forms a groove at the inner body side, the groove extends about a pin axis, the hook body forms a slot at the outer body side, and the retention assembly includes a semi-annular stopper, a rack, and a pinion gear, the semi-annular stopper is disposed within the groove, the semi-annular stopper extends about the pin axis between and to a first end and a second end, the semi-annular stopper includes an outer radial surface and an inner radial surface, the semi-annular stopper includes a stopper gear surface at the outer radial surface, and the semi-annular stopper is pivotable in the groove about the pin axis between and to an extended pivot position and a retracted pivot position, the rack is disposed within the slot, the rack extends between and to an outer rack side and an inner rack side, the outer rack side is disposed at the outer body side, the rack includes a linear rack gear surface at the inner rack side, and the rack is translatable within the slot between a first translation position and a second translation position, and the pinion gear is disposed within the hook body, the pinion gear is rotatable about a rotational axis, the pinion gear includes a pinion gear surface, and the pinion gear surface is engaged with the stopper gear surface and the linear rack gear surface.

12. The latch assembly of claim 11, further comprising a second latch assembly portion, the second latch assembly portion includes a latch pin, and the latch pin is positionable within the hook at the pin axis.

13. The latch assembly of claim 12, further comprising a first hinged cowl panel and a second hinged cowl panel adjacent the first hinged cowl panel, the first latch assembly portion is mounted to the first hinged cowl panel, and the second latch assembly portion is mounted to the second hinged cowl panel.

14. The latch assembly of claim 12, wherein the stopper in the extended pivot position extends outside of the hook body relative to the pin axis, and the stopper in the extended pivot position radially obstructs the latch pin with the latch pin positioned at the pin axis.

15. The latch assembly of claim 14, wherein with the stopper in the retracted pivot position, the first end is disposed within the hook body.

16. The latch assembly of claim 11, wherein the retention assembly further includes a biasing member disposed within the slot, and the biasing member is disposed between the hook body and the rack to bias the rack in the second translation position.

17. The latch assembly of claim 11, wherein:

translation of the rack from the second translation position to the first translation position pivots the stopper from the extended pivot position to the retracted pivot position, and translation of the rack from the first translation position to the second translation position pivots the stopper from the retracted pivot position to the extended pivot position.

18. A latch assembly for an aircraft propulsion system, the latch assembly comprising:

a first latch assembly portion including a hook, the hook includes a hook body and a retention assembly, the hook body forms a hook engagement surface of the hook, the hook engagement surface extends about a pin axis, the hook body forms a groove at the hook engagement surface, the groove extends about the pin axis, and the hook body forms a slot, and the retention assembly includes a semi-annular stopper, a rack, a pinion gear, and a biasing member, the semi-annular stopper is disposed within the groove, the semi-annular stopper extends about the pin axis between and to a first end and a second end, the semi-annular stopper includes an outer radial surface and an inner radial surface, the semi-annular stopper includes a stopper gear surface at the outer radial surface, and the semi-annular stopper is pivotable in the groove about the pin axis between and to an extended pivot position and a retracted pivot position, the rack is disposed within the slot, the rack extends between and to an outer rack side and an inner rack side, the rack includes a linear rack gear surface at the inner rack side, and the rack is translatable within the slot between a first translation position and a second translation position, the pinion gear is disposed within the hook body, the pinion gear is rotatable about a rotational axis, the pinion gear includes a pinion gear surface, and the pinion gear surface is engaged with the stopper gear surface and the linear rack gear surface, and the biasing member is disposed within the slot, and the biasing member is disposed between the hook body and the rack to bias the rack in the second translation position.

19. The latch assembly of claim 18, wherein:

translation of the rack from the second translation position to the first translation position pivots the stopper from the extended pivot position to the retracted pivot position, and translation of the rack from the first translation position to the second translation position pivots the stopper from the retracted pivot position to the extended pivot position.

20. The latch assembly of claim 18, wherein:

the hook body extends between and to a first hook lateral end and a second hook lateral end, and the hook body has a first lateral width extending from the first hook lateral end to the second hook lateral end;

the stopper is disposed in the groove at a laterally intermediate portion of the hook body, the stopper extends between and to a first stopper lateral end and a second stopper lateral end, and the stopper has a second lateral width extending from the first stopper lateral end to the second stopper lateral end;

and the second lateral width is between 20 percent and 50 percent of the first lateral width.

* * * * *